Patented May 25, 1943

2,320,253

UNITED STATES PATENT OFFICE 2,320,253

PROCESS FOR THE PRODUCTION OF FORMALDEHYDE

Herrick R. Arnold, New Castle County, Del., assignor to E. I. du Pont de Nemours & Company, Wilmington, Del., a corporation of Delaware No Drawing. Application March 8, 1940, Serial No. 322,932

7 Claims. (Cl. 260—603)

This invention relates to the catalytic oxidation of alcohols to aldehydes and ketones.

This invention has as an object to provide a new and improved catalytic method for converting methanol to formaldehyde. Other objects will be apparent from the reading of the following description of the invention.

These objects are accomplished by the following invention which comprises mixing or intimately associating an oxide of molybdenum with an oxide of tungsten. The catalyst so obtained has been found to be particularly useful for the catalytic oxidation of methanol to formaldehyde at temperatures within the range of about 225° to about 450° C.

Example I

A catalyst containing the oxides of molybdenum and tungsten in approximately equimolar proportions was prepared by igniting a mixture of the ammonium para-salts of molybdic and tungstic acids as follows: 354 g. of ammonium paramolybdate, and 540 g. of ammonium paratungstate were ground together to a dry, powdered mixture passing a 60-mesh screen. This mixture was then ignited to constant weight by heating at 375° to 400° C. After cooling to room temperature, the dry powder was kneaded to a thick, moist, dough-like mass with approximately 10% by weight of water, and dried to a hard, porous cake at 110° to 120° C. The resulting solid mass, consisting throughout of a mixture of the oxides of molybdenum and tungsten, was then broken into granules of 4 to 10 mesh size and baked at 375° to 400° C. for 20 hours.

A mixture of air and methanol vapor, containing 10% by weight of methanol, was preheated and passed continuously at the rate of 0.3 cubic feet per hour, over 65 cc. of the catalyst maintained at 260° to 310° C. The effluent product was cooled and passed through water whereby an aqueous solution of formaldehyde and unchanged methanol, containing an amount of formic acid equivalent to less than 0.1% of the methanol, was obtained. Under these conditions a methanol conversion of 82 to 83% was obtained in one passage of the vapor mixture over the catalyst, with yields of formaldehyde amounting to 85 to 87%. These conversions and yields were maintained without diminution for a period of about 70 hours.

Example II

A more active catalyst than the one described above, and containing the oxides of tungsten and molybdenum in the molar ratio $$WO_3/MoO_3 = 1.22$$

was prepared by the following improved method: 263.4 g. of ammonium para-molydate and 430.2 g. of ammonium para-tungstate were ground to a thick, uniform paste with 276 cc. of water. To the finely ground slurry there was added, with stirring, 350 cc. of a 42.5% solution of nitric acid whereby a finely coagulated mixture of hydrated molybdic and tungstic acids was precipitated in a semi-gelatinous form. The precipitate was isolated by filtration and washed on the filter with 750 cc. of water, dried at 110° to 120° C., and baked for 5 hours starting at 210° C. and increasing the temperature to 315° C., after which the baking was continued at 315° to 320° C. for an additional 2 hours. The resulting hard, porous, homogeneous mass was then sized to 4 to 10 mesh granules. Sixty-five cc. of the catalyst, placed in a suitable converter, was heated to 258° C. A mixture of air and methanol vapor containing 8 to 10% of methanol was preheated and passed continuously over the catalyst at the rate of 0.295 cu. ft. per minute. Under these conditions the time of contact of the air-methanol mixture with the catalyst was about 0.24 sec. Approximately 93 to 95% of the methanol introduced into the catalyst chamber was recovered, in a single passage over the catalyst, as formaldehyde in the finished product, the remainder of the methanol being recovered unchanged, or as formic acid equivalent to less than 0.1% of the methanol passed. When the reaction temperature was increased to 305° C., 97 to 100% conversion of the methanol to formaldehyde was obtained with no appreciable increase in the formation of formic acid.

Example III

The durability or life of the catalyst prepared in accordance with Example II, was still further improved by introducing into the method of preparation described in Example II the additional step of oxidizing the catalyst to its highest state of oxidation (namely to a mixture of the catalytic oxides of molybdenum and tungsten consisting substantially of mixtures of their trioxides). This step was accomplished by subjecting a catalyst prepared according to Example II, above, to a heat treatment at temperatures of approximately 450° C. in a stream of air or oxygen for periods of 14 to 48 hours whereby the lower oxides of molybdenum and tungsten were converted to the trioxides. Simultaneously the high temperature oxidation treatment had the effect of hardening the catalyst and making it more resistant to erosion and disintegration during use.

When a mixture of air and methanol vapor containing 8 to 10% by weight of methanol was preheated and passed at the rate of 0.3 cu. ft. per minute over 65 cc. of the catalyst, prepared as described in this example, and maintained at a temperature of 250° to 320° C., substantially 92% to 95% of the methanol fed into the catalyst chamber was recovered as formaldehyde in the finished product over a period of about 1000 hours of continuous operation.

Example IV

Octyl alcohol was fed continuously at the constant rate of 61.7 g. per hour into a vaporizing and preheating chamber where it was vaporized and mixed continuously with 2.9 times its weight of air. The air-alcohol mixture was preheated to 300° C. and passed continuously at atmospheric pressure over 22.5 cc. of the catalyst prepared as described in Example II heated to a temperature of 280° to 300° C. The time during which the air-alcohol mixture remained in contact with the catalyst was about 0.26 second. Under these conditions 66% of the octyl alcohol was oxidized to octanal, and 95.2% of the alcohol processed was recovered as aldehyde and unchanged alcohol.

Similar yields of butyraldehyde, isobutyraldehyde, and cyclohexanone were obtained by oxidizing, respectively, n-butanol, iso-butanol, and cyclohexanol under the same conditions described above.

Although the foregoing examples have illustrated certain methods for preparing the catalysts and the manner of their use in the oxidation of alcohols to aldehydes and ketones it is to be understood that many modifications and extensions of the invention may be made without departing from the spirit and scope thereof.

The catalysts broadly contemplated in this invention comprise essentially intimate mixtures of the oxides of molybdenum and tungsten. These molybdic oxide-tungstic oxide catalyst compositions may be modified by incorporating therein a third oxide which acts as a promoting or modifying agent. Examples of such oxides are the oxides of uranium, chromium, iron, manganese, copper, cadmium, vanadium, etc. It is known that these two elements may exist in many states of oxidation and all possible combinations of these oxides are to be recognized as coming within the scope of this invention. Thus, although the most active catalyst compositions consist of mixtures of the trioxides of molybdenum and tungsten, as illustrated in the above examples, mixtures of the so-called "blue" oxides of tungsten and molybdenum, as well as their dioxides and sesqui-oxides, are also catalytically active.

The proportion of the oxides of the two metals may vary widely but it is desirable that one or more of the oxides of both metals be present since it has been observed that oxides of either metal alone are notably deficient in activity. It is preferable to use catalyst mixtures containing the trioxides of molybdenum and tungsten in approximately equi-molar proportions. However, the proportions of these elements may vary from at least 10 moles of molybdenum per mole of tungsten, to at least 10 moles of tungsten per mole of molybdenum.

The oxide catalysts may be prepared in a number of different ways, as for example: by simple mixing or grinding together of molybdic and tungstic anhydrides with sufficient water to form a thick paste and subsequently drying, baking, and sizing the resulting product. A still better method consists of igniting intimate mixtures of the ammonium salts of the metals. It is preferred, however, to coprecipitate hydrated molybdic and tungstic acids in suitable proportions by acidifying wet mixtures of the finely ground ammonium salts with an excess of nitric or hydrochloric acids or mixtures of these acids, and drying and baking the resulting coagulated, semi-gelatinous precipitate. A further step in the preferred method consists in finally subjecting the catalyst to treatment in an oxidizing atmosphere at elevated temperatures, preferably in the range 350° to 450° C., to convert the oxide mixture to the trioxides or highest state of oxidation, whereby a bright orange or yellow, porous, granular catalyst is obtained which has sufficient inherent strength to withstand erosion and other factors encountered during use which tend to cause disintegration of the catalyst.

Further improvements in physical strength of the catalyst may be made by briquetting the catalyst or by introducing binders such as colloidal silica. In some cases it may be desirable or even preferable to apply the catalytic masses to carrier substances or surface-extending agents such as silica gel or kieselguhr; or the catalytically active compounds may actually be precipitated or otherwise formed within the pores of the carrier or surface-extending substances.

Considering the oxidation of methanol to formaldehyde as a typical example of the use of the catalyst of this invention, the temperature of the catalyst may vary over a wide range dependent upon such other factors as time of contact and the particular composition of the catalyst. While the temperatures employed may vary from about 225° C. to about 450° C., it is ordinarily preferred to operate within the range 250° to 350° C.

The ratio of methanol to air used with these catalysts may also vary considerably, although usually the air is used in greater than the theoretical quantity required to oxidize the alcohol to formaldehyde. Mixtures containing 5 to 20% by weight of methanol in the form of vapor may be employed, but it is ordinarily preferred to use mixtures containing 8 to 10% by weight of methanol. In place of methanol any primary or secondary alcohol may be converted to the corresponding aldehyde or ketone. The alcohol may be aromatic, aliphatic, or a cycloaliphatic alcohol and one that is capable of vaporization.

Wide variations in the time of contact of the gases with the catalyst may be employed depending to some extent upon the temperature, composition, and character of the catalyst. The shortest possible time of contact is of course desirable and this may be as low as a few hundredths of a second, but it is ordinarily found that contact periods of 0.1 to 0.5 second will be most effective.

The use of the oxide catalysts of this invention possesses a number of advantages over the catalysts heretofore used in the oxidation of alcohols. For example it is possible to obtain higher conversions of methanol and higher yields of formaldehyde with less combustion losses, and lower by-products, especially acid, than are possible with catalysts at present known to the art. As contrasted particularly with vanadium oxide catalysts, the molybdenum oxide-tungsten oxide catalysts of this invention produce substantially acid-free formaldehyde. While the catalysts of this invention may be used for the oxidation of any alcohol, they are particularly useful in the conversion of methanol to formaldehyde.

The catalysts have the additional advantage that they possess considerable inherent strength so that they do not necessarily require the use of a support, and can be used for long periods without appreciable erosion or disintegration. Furthermore, although they are catalytically active at relatively low temperatures, they are quite resistant to high temperatures of the order of 450° to 550° C. or higher, where many catalysts ordinarily sinter and become inactive. They are comparatively insensitive, also, to the usual catalyst "poisons" such as sulfur and its compounds.

It is apparent that many widely different embodiments of this invention may be made without departing from the spirit and scope thereof and therefore it is not intended to be limited except as indicated in the appended claims.

I claim:

1. A process for the production of formaldehyde which comprises catalytically oxidizing methanol at a temperature within the range of about 225° C. to about 450° C. while in contact with a mixture of the oxides of tungsten and molybdenum.

2. The process in accordance with claim 1 characterized in that the oxidation reaction is carried out at a temperature within the range of 225° to 350° C.

3. A process for the production of formaldehyde which comprises catalytically oxidizing methanol at a temperature within the range of 250° to 350° C. in the presence of an intimate mixture of the oxides of molybdenum and tungsten.

4. A process for the production of formaldehyde which comprises catalytically oxidizing methanol at a temperature within the range of 250° C. to 350° C. in the presence of a mixture of the trioxides of molybdenum and tungsten.

5. The process in accordance with claim 4 characterized in that the trioxides of molybdenum and tungsten are present in equimolecular proportions.

6. A process for the production of formaldehyde which comprises catalytically oxidizing methanol at a temperature within the range of about 225° C. to 450° C. while in contact with a mixture of the oxides of tungsten and molybdenum, said mixture of oxides being characterized in that the molecular ratios of the two ingredients are within the range of 10:1 and 1:0.

7. A process for the production of formaldehyde which comprises catalytically oxidizing methanol at a temperature within the range of about 225° C. to 450° C. while in contact with a mixture of the oxides of tungsten and molybdenum, said mixture of oxides being characterized in that they are prepared from an intimately commingled mixture of the hydrous oxides of tungsten and molybdenum in such proportions that the molecular ratios of the two ingredients are within the range of 10:1 and 1:10.

HERRICK R. ARNOLD.

CERTIFICATE OF CORRECTION.

Patent No. 2,320,253.  May 25, 1943.

HERRICK R. ARNOLD.

It is hereby certified that error appears in the printed specification of the above numbered patent requiring correction as follows: Page 2, second column, line 6-7, for "Howerer" read --However--; page 3, second column, line 27, for "and 1:0" read --and 1:10--; and that the said Letters Patent should be read with this correction therein that the same may conform to the record of the case in the Patent Office.

Signed and sealed this 20th day of July, A. D. 1943.

(Seal)
Henry Van Arsdale,
Acting Commissioner of Patents.